(12) United States Patent
Lou et al.

(10) Patent No.: US 12,478,566 B2
(45) Date of Patent: Nov. 25, 2025

(54) COLOR STABLE SKIN BENEFIT COMPOSITIONS

(71) Applicant: Conopco, Inc., Englewood Cliffs, NJ (US)

(72) Inventors: Anjing Lou, Seymour, CT (US); Congling Quan, Woodbridge, CT (US); William Zavoluk, Milford, CT (US); Teanoosh Moaddel, Watertown, CT (US)

(73) Assignee: Conopco, Inc., Hoboken, NJ (US)

( * ) Notice: Subject to any disclaimer, the term of this patent is extended or adjusted under 35 U.S.C. 154(b) by 0 days.

(21) Appl. No.: 18/647,063

(22) Filed: Apr. 26, 2024

(65) Prior Publication Data

US 2024/0285486 A1 Aug. 29, 2024

Related U.S. Application Data

(63) Continuation of application No. 16/630,140, filed as application No. PCT/EP2018/066640 on Jun. 21, 2018, now abandoned.

(30) Foreign Application Priority Data

Jul. 12, 2017 (EP) .................................. 17180848

(51) Int. Cl.
*A61K 8/06* (2006.01)
*A61K 8/34* (2006.01)
*A61K 8/67* (2006.01)
*A61K 8/92* (2006.01)
*A61Q 19/08* (2006.01)
*B82Y 5/00* (2011.01)

(52) U.S. Cl.
CPC .............. *A61K 8/068* (2013.01); *A61K 8/345* (2013.01); *A61K 8/671* (2013.01); *A61K 8/92* (2013.01); *A61Q 19/08* (2013.01); *A61K 2800/10* (2013.01); *A61K 2800/413* (2013.01); *A61K 2800/524* (2013.01); *B82Y 5/00* (2013.01)

(58) Field of Classification Search
CPC ..... A61Q 19/08; A61K 2800/10; A61K 8/068
See application file for complete search history.

(56) References Cited

U.S. PATENT DOCUMENTS

| 11,540,984 | B2 * | 1/2023 | Lou ......................... A61K 8/06 |
| 2021/0205186 | A1 * | 7/2021 | Lou ......................... A61K 8/06 |
| 2022/0151886 | A1 * | 5/2022 | Lou ......................... A61K 8/06 |

* cited by examiner

*Primary Examiner* — Mark V Stevens
*Assistant Examiner* — Alparslan Asan
(74) *Attorney, Agent, or Firm* — Edward A. Squillante, Jr.

(57) ABSTRACT

Nanoemulsions as emulsion additives are prepared to stabilize actives and prevent formulation discoloration. The nanoemulsions have at least 30% by weight oil and are suitable to add to emulsions and/or structured water to produce color stable end use skin benefit compositions.

15 Claims, No Drawings

COLOR STABLE SKIN BENEFIT COMPOSITIONS

This application is a continuation application of pending U.S. Patent Application No. 2021/0000707A1 having Ser. No. 16/630,140, filed on Jan. 10, 2020.

FIELD OF THE INVENTION

The present invention is directed to nanoemulsions that stabilize actives like retinoic acid precursors. More particularly, the invention is directed to nanoemulsions that are preferably water continuous and suitable to be dispersed in end use skin benefit compositions. The nanoemulsions comprise at least 30% by weight oil, and surprisingly, improve color stability of actives present therein.

BACKGROUND OF THE INVENTION

Many consumers find it desirable to deliver skin benefits via methods that rely on the application of topical compositions. This is especially true when consumers wish to look younger by reducing facial lines and wrinkles as well as blotchy color marks on the skin.

Minimizing cutaneous aging, both intrinsic and from photoaging, is often attempted with compositions having, for example, actives such as retinoic acid precursors, resorcinols and the like. While such compositions can provide benefits to skin, instability of such actives typically results in formulation discoloration leading to consumer dissatisfaction with such compositions. This is true because a product that discolors often results in a consumer discarding the product for fear that the same is no longer efficacious.

It is of increasing interest to develop a stable skin benefit composition with active where the same is suitable to provide benefits to skin and has reduced amounts of premature discoloration originating from the active present therein.

This invention, therefore, is directed to a skin benefit composition with stabilized actives like resorcinol and retinoic acid precursors. The composition of the present invention surprisingly can be topically applied without causing skin irritation and displays reduced discoloration while simultaneously delivering excellent skin benefits. The present invention includes a nanoemulsion with active that is suitable to be dispersed in a chassis to yield an end use skin benefit composition. The nanoemulsion comprises at least 30% by weight oil, and surprisingly, improves color stability of end use compositions they are formulated in by preventing degradation of active resulting from active exposure to heat, oxygen, ultraviolet light or the like.

Additional Information

Efforts have been disclosed for making formulations to treat skin. In U.S. Pat. No. 4,826,828, retinol comprising compositions with volatile silicones are described.

Still other efforts have been disclosed for making formulations to treat skin. In U.S. Patent Application No. 2010/0305218, oil-in-water nanoemulsions suitable as active delivery vehicles are described.

Even other efforts have been disclosed for making formulations to treat skin. In BRP10905347, deformable nanocapsules are described.

U.S. Pat. Nos. 6,863,897, 6,869,598, and 6,858,217 all describe topical compositions with resorcinols. In Korean Patent KR101002433B1, nanoemulsions with actives are described.

None of the additional information above describes a composition with stabilized actives as claimed in this invention.

SUMMARY OF THE INVENTION

In a first aspect, the present invention is directed to a nanoemulsion comprising:
(a) active;
(b) water;
(c) water soluble humectant;
(d) oil, and
(e) emulsifier
wherein the active is soluble in the oil, the nanoemulsion has a particle size from 0.05 microns to less than 1.5 microns and comprises at least 30% by weight oil.

In a second aspect, the invention is directed to an end use skin benefit composition comprising dispersed therein at least 25% by weight of the nanoemulsion of the first aspect of this invention.

In a third aspect, the invention is directed to a method for preventing composition discoloration by preparing an end use skin benefit composition with active in the nanoemulsion as described in the first aspect of the invention.

All other aspects of the present invention will readily become apparent upon considering the detailed description and examples which follow.

Skin, as used herein, is meant to include skin on the feet, face, neck, chest, back, arms, under arms, hands, legs, buttocks and scalp (including hair). The end use skin benefit composition of this invention includes creams, lotions, balms, serums, deodorants and antiperspirants, shampoos, conditioners, bars and liquid wash products. In a preferred embodiment, the end use composition of this invention is a leave-on composition like a leave-on cream or lotion, and especially, one to be applied to the face and/or hands.

Active, as used herein, means an oil soluble agent that benefits skin (like a resorcinol derivative or the like) or a precursor to an agent that benefits skin like retinoic acid precursors. Active, therefore, is an agent that is suitable to be formulated in the oil phase of the nanoemulsion described in this invention to improve a skin characteristic. Retinoic acid precursor means a component that, when oxidized, can convert to retinoic acid (especially after penetrating the skin). Examples of such a component include retinol, retinal, retinyl propionate, retinyl palmitate, retinyl acetate, hydroxyanasatil retinoate (i.e., Retextra®) mixtures thereof or the like. Unless explicitly stated otherwise, all ranges described herein are meant to include all ranges subsumed therein. The term comprises is meant to encompass the terms consisting essentially of and consisting of. For the avoidance of doubt, and for example, a composition comprising retinoic acid precursor and resorcinol is also meant to include a composition consisting essentially of and a composition consisting of the same. All percentages used herein are meant to be by weight unless stated otherwise. End use skin benefit composition means a composition ready for application (e.g., topically) by a consumer. The end use skin benefit composition of the invention, which is suitable to provide benefit to skin, carries in dispersed form the nanoemulsions described in this invention whereby the same may be interchangeably used with end use composition. The end use composition may have emulsion or structured water as a chassis to carry the nanoemulsion. The end use composition can be oil or water continuous, but a water continuous chassis and end use composition are preferred. Color stability means no visible change in color after spending 8 weeks at 45° C., and particularly, a ΔE of 10% or less (i.e., less color change) measured against macroemulsion of the same composition after assessing both compositions at, again, 45° C. after 8 weeks with a Hunter L,a,b Colorimeter. Resorcinol derivative means at least one hydrogen on the ring structure and/or on the hydroxy group of the resorcinol is/are replaced with, for example, an alkyl group. Nanoemulsion, as used herein, means an emulsion having a particle size of 0.05 to less than 1.5 microns. Nanoemulsion also means the emulsion added to and dispersed in an emulsion or structured water to yield end use skin benefit composition. Macroemulsion means having a particle size of 1.5 microns or greater. Particle size, as used herein, means the largest measurable diameter (based on volume average of a non-perfect sphere) of the nanoemulsion particle. Structured water is defined to mean water with at least 0.2% by weight thickening agent and having a viscosity from 1,500 to 100,000 cps. Viscosity as noted herein is taken on a Brookfield Viscometer (DV-1+), sample temperature at 25 degrees celsius, 20 RPM, RVG, 30 seconds.

Except in the operating and comparative examples, or where otherwise explicitly indicated, all numbers in this description indicating amounts or ratios of materials or conditions and/or physical properties of materials and/or use thereof are to be understood as modified by the word "about".

DETAILED DESCRIPTION OF THE INVENTION

The only limitation with respect to the active suitable for use in this invention is that the same is soluble in the oil within the internal phase of the nanoemulsion. Preferred actives suitable for use are retinoic acid precursors. Illustrative examples of the retinoic acid precursors that may be used in this invention include those represented by the formula

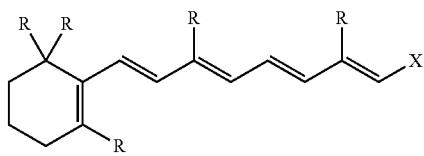

where each R is independently a hydrogen or a $C_{1-6}$ alkyl group and X is

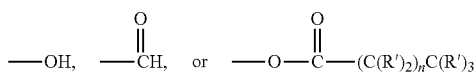

and further where each R' is hydrogen or a $C_1$-$C_8$ alkyl and n is an integer from 0 to 16 (preferably, 1 to 5).

Preferably, the retinoic acid precursor is retinol, retinal, retinyl propionate, retinyl palmitate, retinyl acetate or a mixture thereof. Retinyl palmitate (n=14), R=$CH_3$, R'=H,

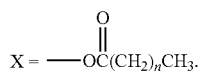

(n = 14 and R' = H)

is a preferred retinoic acid precursor. Retinyl propionate is most preferred,

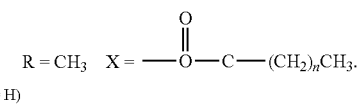

(n = 1 and R' = H)

Still another retinoic acid precursor suitable for use is hydroxyanasatil retinoate made commercially available under the name Retextra® as supplied by Molecular Design International. The same may be used in a mixture with the precursors described herein.

Other preferred actives suitable for use include resorcinol (benzenediol) and its derivatives like 4-ethyl resorcinol, 4-hexyl resorcinol, 4-phenylethyl resorcinol, 4-cyclopentyl resorcinol, 4-cyclohexyl resorcinol, 4-isopropyl resorcinol mixtures thereof or the like. Additional resorcinol derivatives suitable for use are 5-substituted resorcinol derivatives as described in commonly assigned U.S. Published Patent Application No. 2016/0000669A1. These additional resorcinols are represented by the formula

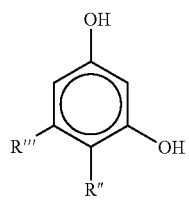

where R" and R'" are each independently an alkyl, alkenyl, aryl or halogen. Preferred 5-substituted resorcinols include 4-cyclohexyl-5-methylbenzene-1,3-diol, 4-isopropyl-5-methylbenzene-1,3-diol, mixtures thereof or the like.

Typically the amount of active used in the nanoemulsions of this invention is from 0.001 to 10%, and preferably, from 0.01 to 6%, and most preferably, from 0.05 to 3.5%, based on total weight of the nanoemulsion and including all ranges subsumed therein.

Water typically makes up from 10% to less than 70%, and preferably, from 12% to 65%, and most preferably, from 19 to 55% by weight of the nanoemulsion, including all ranges subsumed therein. In a preferred embodiment, the nanoemulsion has a particle size from 0.1 to 0.8 microns, and preferably, from 0.1 to 0.6 microns. In a most preferred embodiment, the nanoemulsion described in this invention is water continuous.

The humectant suitable for use in the nanoemulsions of this invention is one which is water soluble and forms part of the phase with water present. Illustrative examples of the humectants suitable for use in the nanoemulsions include glycerine, glycerol, sorbitol, polyethylene glycol, dipropylene glycol, polypropylene glycol, hydroxypropyl sorbitol, hexylene glycol, 1,3-butylene glycol, isoprene glycol, mixtures there or the like.

Typically, the humectants suitable for use in the nanoemulsion of this invention make up from about 0.5 to 50%, and preferably, from 1 to 40%, and most preferably, from 1 to 35% by weight of the nanoemulsion, including all ranges subsumed therein. Such humectants may be used in the chassis that forms part of the end use skin benefit compositions but usually at half the amounts noted for use in the nanoemulsions.

The nanoemulsions of this invention will have cosmetically acceptable carriers, like oils, for oil soluble active to be dissolved therein. Such oils may also be used in forming the continuous or internal phase of the chassis used in combination with nanoemulsion for making the end use skin benefit composition when such chassis for the nanoemulsion is not structured water.

As to the chassis of the end use skin benefit compositions, water is the most preferred carrier. Amounts of water may range from 1 to less than 75%, and preferably, from 5 to less than 70%, and most preferably, from 35 to 65%, and optimally, from 40 to 65% by weight, based on total weight of the chassis of the end use skin benefit composition and including all ranges subsumed therein. Ordinarily the end use compositions of this invention will be water and oil emulsions, most preferably, of the oil-in-water variety. Water-in-oil emulsions, and especially, those generally classified as water-in-oil and high internal phase emulsions are, however, an option. Illustrative examples of the high internal phase emulsions suitable to act as a chassis for the nanoemulsions of this invention are described in commonly owned U.S. Patent Application Publication No. 2008/0311058 and U.S. Pat. No. 8,425,882.

Mineral oils, silicone oils, esters, and alcohols can be used in the nanoemulsion and chassis of the end use skin benefit composition described herein. Amounts of these materials may collectively range from 0.1 to less than 75%, and preferably, from 0.1 to 45%, and most preferably, from 1 to 20% by weight of the chassis of the end use skin benefit composition of this invention, including all ranges subsumed therein. As to the nanoemulsion, typically the same comprises at least 30% by weight oil, and preferably, from 30 to 65%, and most preferably, from 36 to 60% by weight oil, based on total weight of the nanoemulsion and including all ranges subsumed therein.

Silicone oils, suitable for use in the nanoemulsions and the chassis of the end use skin benefit compositions of this invention, may be divided into the volatile and non-volatile variety. The term "volatile" as used herein refers to those materials which have a measurable vapor pressure at ambient temperature. Volatile silicone oils are preferably chosen from cyclic or linear polydimethylsiloxanes containing from 3 to 9, and preferably, from 4 to 5 silicon atoms.

Linear volatile silicone materials generally have viscosities of less than 5 centistokes at 25° C. while cyclic materials typically have viscosities of less than about 10 centistokes.

Nonvolatile silicone oils useful as carrier material include polyalkyl siloxanes, polyalkylaryl siloxanes and polyether siloxane copolymers. The essentially non-volatile polyalkyl siloxanes useful herein include, for example, polydimethylsiloxanes (like dimethicone) with viscosities of from 5 to 100,000 centipoise at 25° C.

An often preferred silicone source is a cyclopentasiloxane and dimethiconol solution.

Among suitable esters are:
(I) Alkenyl or alkyl esters of fatty acids having 10 to 20 carbon atoms like isopropyl palmitate, isopropyl isostearate, isononyl isonanonoate, oleyl myristate, isopropyl myristate, oleyl stearate, and oleyl oleate;
(2) Ether-esters such as fatty acid esters of ethoxylated fatty alcohols;
(3) Polyhydric alcohol esters such as ethylene glycol mono- and di-fatty acid esters, diethylene glycol mono- and di-fatty acid esters, polyethylene glycol (200-6000) mono- and di-fatty acid esters, propylene glycol mono- and di-fatty acid esters, polypropylene glycol 2000 monooleate, polypropylene glycol 2000 mono stearate, ethoxylated propylene glycol monostearate, glyceryl mono- and di-fatty acid esters, polyglycerol poly-fatty esters, ethoxylated glyceryl mono-stearate, 1,3-butylene glycol monostearate, 1,3-butylene glycol distearate, polyoxyethylene polyol fatty acid ester, sorbitan fatty acid esters, and polyoxy-ethylene sorbitan fatty acid esters;
(4) Wax esters such as beeswax, spermaceti, myristyl myristate, stearyl stearate; and
(5) Sterol esters, of which soya sterol and cholesterol fatty acid esters are examples thereof.

Often, oils such as caprylic capric triglyceride are preferred as carriers.

Emulsifiers suitable for use in the nanoemulsions and the chassis used to yield the end use skin benefit compositions of the present invention (when the chassis is not structured water) will have an HLB from 4-17. The HLB of the emulsifier used will be 4-6 when oil continuous emulsions and nanoemulsions are desired. Preferably the emulsions have an HLB from 7 to 17, and preferably, from 7 to 16, and most preferably, 8 to 14, including all ranges subsumed therein. Total concentration of the emulsifier (in the chassis used for end use composition) may range from about 0.1 to 40%, and preferably, from 1 to 20%, and most preferably, from 1 to 5% by weight of the composition, including all ranges subsumed therein. Total amount of emulsifier used within the nanoemulsion is typically from 5 to 18%, and preferably, from 6 to 15%, and most preferably, from 7 to 11% by weight, including all ranges subsumed therein. The emulsifier may be selected from the group consisting of anionic, nonionic, cationic and amphoteric actives. Particularly preferred nonionics are those with a $C_{10}$-$C_{20}$ fatty alcohol or acid hydrophobe condensed with from about 2 to about 100 moles of ethylene oxide or propylene oxide per mole of hydrophobe; $C_2$-$C_{10}$ alkyl phenols condensed with from 2 to 20 moles of alkylene oxide; mono- and di-fatty acid esters of ethylene glycol; fatty acid monoglyceride; sorbitan, mono- and di-$C_8$-$C_{20}$ fatty acids; and polyoxyethylene sorbitan as well as combinations thereof. Alkyl polyglycosides and saccharide fatty amides (e.g. methyl gluconamides) are also suitable nonionic emulsifiers.

Preferred anionic emulsifiers include alkyl ether sulfate and sulfonates, alkyl sulfates and sulfonates, alkylbenzene sulfonates, alkyl and dialkyl sulfosuccinates, $C_8$-$C_{20}$ acyl isethionates, $C_8$-$C_{20}$ alkyl ether phosphates, alkyl ether carboxylates and combinations thereof.

Cationic emulsifiers that may be used include, for example, palmitamidopropyltrimonium chloride, distearyldimonium chloride and mixtures thereof. Useful amphoteric emulsifiers include cocoamidopropyl betaine, $C_{12}$-$C_{20}$ trialkyl betaines, sodium lauroamphoacetate, and sodium laurodiamphoacetate or a mixture thereof.

The generally preferred emulsifiers include glyceryl stearate, glycol stearate, stearamide AMP, PEG-100 stearate, cetyl alcohol as well as emulsifying/thickening additives like hydroxyethylacrylate/sodium acryloyldimethyl taurates copolymer/squalane and mixtures thereof.

In an especially preferred embodiment, the emulsifier used in the nanoemulsion is Tween®40 (polyoxyethylene sorbitan monopalmitate). In another especially preferred embodiment, the nanoemulsions of this invention are used to prevent end use composition discoloration originating from actives.

Preservatives can desirably be incorporated into the nanoemulsions and the chassis of the end use skin benefit compositions of this invention to protect against the growth of potentially harmful microorganisms. Suitable traditional preservatives for compositions of this invention are alkyl esters of para-hydroxybenzoic acid. Other preservatives which have more recently come into use include hydantoin derivatives, propionate salts, and a variety of quaternary ammonium compounds. Cosmetic chemists are familiar with appropriate preservatives and routinely choose them to satisfy the preservative challenge test and to provide product stability. Particularly preferred preservatives are iodopropynyl butyl carbamate, phenoxyethanol, hydoxyacetophenore, 1,2-octanediol, ethylhexylglycerine, hexylene glycol, methyl paraben, propyl paraben, imidazolidinyl urea, sodium dehydroacetate and benzyl alcohol. The preservatives should be selected having regard for the use of the composition and possible incompatibilities between the preservatives and other ingredients in the emulsion. Whether nanoemulsion or the chassis of the end use skin benefit composition, preservatives are preferably employed in amounts ranging from 0.01% to 2% by weight of the total weight of the nanoemulsion and end use skin benefit composition, including all ranges subsumed therein. Combinations of 1,2-octanediol and phenoxyethanol, or iodopropynyl butyl carbamate and phenoxyethaol are preferred, with phenoxyethanol making up from 35 to 65% by weight of the total weight of the preservative combination with the phenoxyethanol.

Thickening agents may optionally be included in the nanoemulsions and the chassis of the end use skin benefit compositions of the present invention. Particularly useful are the polysaccharides. Examples include starches, natural/synthetic gums and cellulosics. Representative of the starches are chemically modified starches such as sodium hydroxypropyl starch phosphate and aluminum starch octenylsuccinate. Tapioca starch is often preferred. Suitable gums include xanthan, *sclerotium*, pectin, karaya, arabic, agar, guar, carrageenan, alginate and combinations thereof. Suitable cellulosics include hydroxypropyl cellulose, hydroxypropyl methylcellulose, ethylcellulose and sodium carboxy methylcellulose. Synthetic polymers are yet another class of effective thickening agent. This category includes crosslinked polyacrylates such as the Carbomers, polyacrylamides such as Sepigel 305 and taurate copolymers such as Simulgel EG and Arlstoflex AVC, the copolymers being identified by respective INCI nomenclature as Sodium Acrylate/Sodium Acryloyldimethyl Taurate and Acryloyl Dimethyltaurate/Vinyl Pyrrolidone Copolymer. Another preferred synthetic polymer suitable for thickening is an acrylate-based polymer made commercially available by Seppic and sold under the name Simulgel INS100.

Amounts of the thickener, when used in the nanoemulsion and the chassis of the end use skin benefit composition when an emulsion may range from 0.0 to 5%, and preferably, from 0.1 to 2%, and most preferably, from 0.2 to 1.0% by weight of the nanoemulsion and/or the chassis of the end use composition and including all ranges subsumed therein.

When the end use skin benefit composition is nanoemulsion dispersed in structured water, the structured water typically comprises from 0.2 to 5%, and preferably, from 0.4 to 2.5%, and most preferably, from 0.5 to 1.6% by weight thickener, based on total weight of the end use skin benefit composition, and including all ranges subsumed therein.

When structured water is the chassis, it is typically from 35 to 75%, and preferably, from 40 to 70%, and most preferably, from 45 to 65% by weight water, based on total weight of the structured water and including all ranges subsumed therein. Typically, at least 25% and often from about 30 to 60%, and preferably, 35 to 60%, and most preferably, 40 to 50% by weight nanoemulsion is added to emulsion chassis or structured water chassis to yield end use skin benefit composition, based on total weight of the end use skin benefit composition and including all ranges subsumed therein.

The oil and water phases described herein (whether nanoemulsion or chassis) may include additional optional additives (skin benefit agents or actives that generally do not contribute to composition discoloration) that are soluble in them. Illustrative examples are vitamins like Vitamin B2, Vitamin B3 (niacinamide), Vitamin B6, Vitamin C, Vitamin E, Folic Acid and Biotin. Derivatives of the vitamins may also be employed. For instance, Vitamin C derivatives include ascorbyl tetraisopalmitate, magnesium ascorbyl phosphate and ascorbyl glycoside. Derivatives of Vitamin E include tocopheryl acetate, tocopheryl palmitate and tocopheryl linoleate. DL-panthenol and derivatives may also be employed and Vitamin D and K are also options. Total amount of optional vitamins when present in either phase may range from 0.0 to 10%, preferably from 0.001 to 1%, optimally from 0.01 to 0.5% by weight of the nanoemulsion and/or chassis of the end use skin benefit composition.

Other optional additives suitable for use in this invention include alpha-and/or beta-hydroxyacids, 12-hydroxystearic acid, petroselinic acid, conjugated linoleic acid, creatine, creatinine, retinoid boosters (e.g., climbazole, bifonazole, farnesole, glycyrrchetinic acid, ursolic acid, geranyl geraniol, oleyl betaine, hexanoyl sphingosine) mixtures thereof or the like. Such additives, when used, collectively make up from about 0.001 to about 12% by weight of the nanoemulsion and/or the chassis of end use composition.

Optionally, and in the end use skin benefit composition, desquamation promoters may be present. Illustrative are the alpha-hydroxycarboxylic acids, beta-hydroxycarboxylic acids. The term "acid" is meant to include not only the free acid but also salts and $C_1$-$C_{30}$ alkyl or aryl esters thereof and lactones generated from removal of water to form cyclic or linear lactone structures. Representative acids are glycolic and its derivatives, lactic and malic acids. Salicylic acid is representative of the beta-hydroxycarboxylic acids. Amounts of these materials when present may range from 0.01 to 15% by weight of the nanoemulsion and chassis, individually.

A variety of herbal extracts may optionally be included in the nanoemulsion and/or end use compositions of this invention. The extracts may either be water soluble or water-insoluble and thus carried in a solvent which respectively is hydrophilic or hydrophobic. Water and ethanol are the preferred extract solvents. Illustrative extracts include those from green tea, yarrow, chamomile, licorice, aloe vera, grape seed, citrus unshui, willow bark, sage, thyme and rosemary. Typically, and when present, extracts make up from about 0.01 to 2% by weight of the nanoemulsion and/or chassis of the end use composition.

Also optionally suitable for use include materials like chelators (e.g., EDTA), opacifiers (like $TIO_2$, particle size from 50 to 1200 nm, and preferably, 50 to 350 nm), $C_{8-22}$ fatty acid substituted saccharides, lipoic acid, retinoxytrimethylsilane (available from Clariant Corp. under the SilCare IM-75 trademark), dehydroepiandrosterone (DHEA) and combinations thereof. Ceramides (including Ceramide I, Ceramide 3, Ceramide 36 and Ceramide 6) as well as pseudoceramides may also be useful. Amounts of these materials may range from 0.000001 to 10%, preferably from 0.0001 to 1% by weight of the nanoemulsion and/or chassis end use composition of this invention.

Sunscreen actives may also be included in the nanoemulsions and/or chassis of the end use compositions of the present invention. Particularly preferred are such materials as ethylhexyl p-methoxycinnamate, available as Parsol MCX, Avobenzene, available as Parsol 1789 and benzophenone-3, also known as Oxybenzone. Inorganic sunscreen actives may be employed such as microfine titanium dioxide, octocrylene, zinc oxide, polyethylene and various other polymers.

Amounts of the sunscreen agents when present may generally range from 0.1 to 30%, preferably from 0.5 to 20%, optimally from 0.75 to 10% by weight of the nanoemulsion and/or chassis of the end use composition.

Fragrances, fixatives and abrasives may optionally be included in end use skin benefit compositions of the present invention. Each of these substances may range from about 0.05 to about 5%, preferably between 0.1 and 3% by weight of the nanoemulsion and/or chassis of the end use composition.

Conventional buffers/pH modifiers may be used in the nanoemulsions and/or end use compositions of this invention. These include commonly employed additives like sodium hydroxide, potassium hydroxide, hydrochloric acid, citric acid and citrate/citric acid buffers. In an especially preferred embodiment, the pH of the nanoemulsion and chassis of the end use composition of this invention is from 4 to 8, and preferably, from 4.25 to 7.75, and most preferably, from 6 to 7.5, including all ranges subsumed therein.

The nanoemulsions described in this invention may be prepared by mixing water, oil, active, humectant and emulsifier with a commercially available sonicator like those sold under the name Q Sonica, Mettler and EpiShear™. An often preferred technique includes use of a high pressure homogenizer such as one sold under the name Nano DeBEE from BEE international with homogenization pressure set at 1500 to 6000 psi, and preferably 1750 to 3500 psi, and most preferably from 1850 to 2500 psi, including all ranges subsumed therein. Macroemulsions described in this invention may be made using standard rotor/stator mixers such as those made commercially available as a Silverson L4R mixer.

When making the end use composition of this invention, the desired ingredients are mixed under moderate shear and atmospheric pressure with a commercially available homogonizer.

The viscosity of the nanoemulsions and end use skin benefit composition is from 1500 to 100,000 cps, and preferably, from 3000 to 75,000 cps, and most preferably from 5,000 to 20,000 cps, including all ranges subsumed therein.

A wide variety of packaging can be employed to store and deliver the end use skin benefit composition of this invention. Packaging is often dependent upon the type of personal care end-use. For instance, leave-on skin lotions and creams, shampoos, conditioners and shower gels generally employ plastic containers with an opening at a dispensing end covered by a closure. Typical closures are screw-caps, nonaerosol pumps and flip-top hinged lids. Packaging for antiperspirants, deodorants and depilatories may involve a container with a roll-on ball on a dispensing end. Alternatively these types of personal care products may be delivered in a composition formulation in a container with a propel repel mechanism. Metallic cans pressurized by a propellant and having a spray nozzle serve as packaging for antiperspirants, shave creams and other personal care products.

The following examples are provided to facilitate an understanding of the present invention. The examples are not intended to limit the scope of the claims.

EXAMPLES

Macroemulsions were made by mixing the identified ingredients using a bench top Silverson L4R rotor/stator mixer. The nanoemulsions were made by passing the resulting macroemulsions through a BEE International Nano DeBEE high pressure homogonizer with pressure set at 2000 psi. The resulting emulsions had a particle size as indicated. All samples had 0.6% by weight retinyl propionate.

TABLE I (Emulsions)

| Ingredients | Sample 1 (weight %) | Sample 2 (weight %) | Sample 3 (weight %) |
|---|---|---|---|
| Water | Balance | Balance | Balance |
| Glycerine | 1.4 | 1.4 | 31.4 |
| Mineral Oil | 44 | 54 | 44 |
| Emulsifier (HLB 15) | 9.9 | 9.9 | 9.9 |
| Macroemulsion (particle size, microns) | 8.0 | 11.0 | 1.84 |
| Nanoemulsion (particle size, microns) | 0.3 | 0.65 | 0.27 |

Example 2

End use skin care compositions were made by mixing, under moderate shear (ambient temperature and atmosphere pressure), the emulsions identified in Example 1 with structured water chassis as identified below.

TABLE II (End Use Compositions)

| Ingredient | weight % |
|---|---|
| Water | Balance |
| Glycerin | 4 |
| EDTA | 0.03 |
| Thickener* | 0.8 |
| Preservative | 0.4 |
| Nanoemulsion or Macroemulsion ** | 45 |

*Ammonium Acryloy/dimethyltaurate/VP copolymer
** Six (6) end use compositions were made with nano-and macroemulsion taken from each Sample 1-3 as identified in Table 1 of Example 1.

Example 3

Color stability of the end use skin benefit compositions made in Table II was assessed at 4 and 8 weeks. Temperature was kept constant at 45° C. The apparatus used to assess color stability was a Hunter L, a, b Colorimeter.

TABLE III (ΔE at 4 and 8 weeks (of End Use Compositions of Table II)

| | 4 weeks | 8 weeks |
|---|---|---|
| Sample 1 macroemulsion | 7.4 | 11.4 |
| Sample 1 nanoemulsion | 4.0 | 6.5 |
| Sample 2 macroemulsion | 4.9 | 8.0 |
| Sample 2 nanoemulsion | 3.0 | 5.0 |
| Sample 3 macroemulsion | 7.8 | 8.2 |
| Sample 3 nanoemulsion | 4.5 | 7.3 |

The results above in Table III unexpectedly show that when making an active comprising nanoemulsion according to this invention, color instability resulting from the active is reduced in end use skin benefit compositions.

The invention claimed is:

1. A method for improving color stability of an end use composition by reducing discoloration originating from active comprising 4-ethyl resorcinol, 4-hexyl resorcinol or both, and retinyl propionate, retinol or both present in the end use composition, the method comprising the steps of:
   a) preparing a water continuous nanoemulsion by mixing with homogenization at a pressure from 1,500 to 6,000 psi (a) the active; (b) water; (c) water soluble humectant (d) oil; and (e) emulsifier, wherein:
      i) the active is soluble in the oil;
      ii) oil as particle in the nanoemulsion has a particle size from 0.05 to less than 1.5 microns; and
      iii) the nanoemulsion comprises at least 30% by weight oil;
   b) combining the nanoemulsion with an emulsion chassis, the emulsion chassis being water continuous; and
   c) shearing the nanoemulsion and emulsion chassis after combining to produce the end use composition; and
   d) recovering the end use composition, wherein the nanoemulsion makes up from 25 to 60% by weight of the end use composition and the end use composition is water continuous.

2. The method according to claim 1 wherein the end use composition is a cream, lotion, balm, or serum.

3. The method according to claim 1 wherein the active comprises retinyl propionate and 4-hexyl resorcinol.

4. The method according to claim 1 wherein the active consists essentially of retinyl propionate and 4-hexyl resorcinol.

5. The method according to claim 1 wherein the end use composition further comprises vitamin B2, niacinamide, vitamin B6, vitamin C, vitamin E, tocopherol acetate, folic acid, biotin, vitamin D, vitamin K, DL-panthenol or a mixture thereof.

6. The method according to claim 1 wherein the end use composition further comprises alpha hydroxy acid, beta hydroxy acid, 12-hydroxystearic acid, petroselinic acid, conjugated linoleic acid, creatine, creatinine, retinoid booster, sunscreen or a mixture thereof.

7. The method according to claim 6 wherein the end use composition does comprise retinoid booster and the retinoid booster is climbazole, bifonazole, farnesole, glycyrrchetinic acid, ursolic acid, geranyl geraniol, oleyl betaine, hexanoyl sphingosine or a mixture thereof.

8. The method according to claim 1 wherein the end use composition further comprises iodopropynyl butyl carbamate, phenoxyethanol, hydoxyacetophenone, 1,2-octanediol, ethylhexylglycerine, hexylene glycol, or a mixture thereof.

9. The method according to claim 1 wherein the end use composition has a pH from 6 to 7.5 and a viscosity from 5 to 20,000 cps.

10. The method according to claim 1 wherein the emulsifier has an HLB from 7 to 17 and the nanoemulsion comprises from 1 to 35% by weight humectant comprising glycerine.

11. The method according to claim 1 wherein the end use composition comprises glycerin, 4-hexyl resorcinol and retinol, and further comprises 1,2-octanediol, ethylhexylglycerin, phenoxyethanol, cetyl alcohol, propylene glycol, 1,3 butylene glycol, or a mixture thereof.

12. An end use composition made by the method of claim 1.

13. The method according to claim 3 wherein the end use composition further comprises niacinamide, vitamin K or both.

14. The method according to claim 3 wherein the end use composition further comprises 12-hydroxystearic acid.

15. The end use composition according to claim 12 wherein the end use composition comprises niacinamide, retinyl propionate and 4-hexyl resorcinol.

* * * * *